United States Patent [19]
Jones

[11] Patent Number: 5,156,175
[45] Date of Patent: Oct. 20, 1992

[54] CONTACT LENS CLEANING APPARATUS

[76] Inventor: Frederick Jones, 1132 Indale Pl. SW, Atlanta, Ga. 30310

[21] Appl. No.: 760,376

[22] Filed: Sep. 16, 1991

[51] Int. Cl.⁵ .............................................. B08B 3/10
[52] U.S. Cl. ................................... 134/188; 134/901; 366/314; 366/326; 366/328
[58] Field of Search ................. 134/901, 188; 206/5.1; 366/314, 326, 328

[56] References Cited
U.S. PATENT DOCUMENTS 3,614,959 10/1971 Schollmaier et al. .......... 134/901 X
4,700,729 10/1987 Thaler .............................. 134/901 X Primary Examiner—Philip R. Coe
Attorney, Agent, or Firm—Leon Gilden

[57] ABSTRACT

A container includes a removable door for positioning of a housing therewithin. The housing includes a cleansing solution therein, with a removable lid mounting a plurality of mesh ocular contact lens members, wherein agitation of the cleaning solution by an underlying blade structure effects cleaning of the contact lenses.

5 Claims, 4 Drawing Sheets

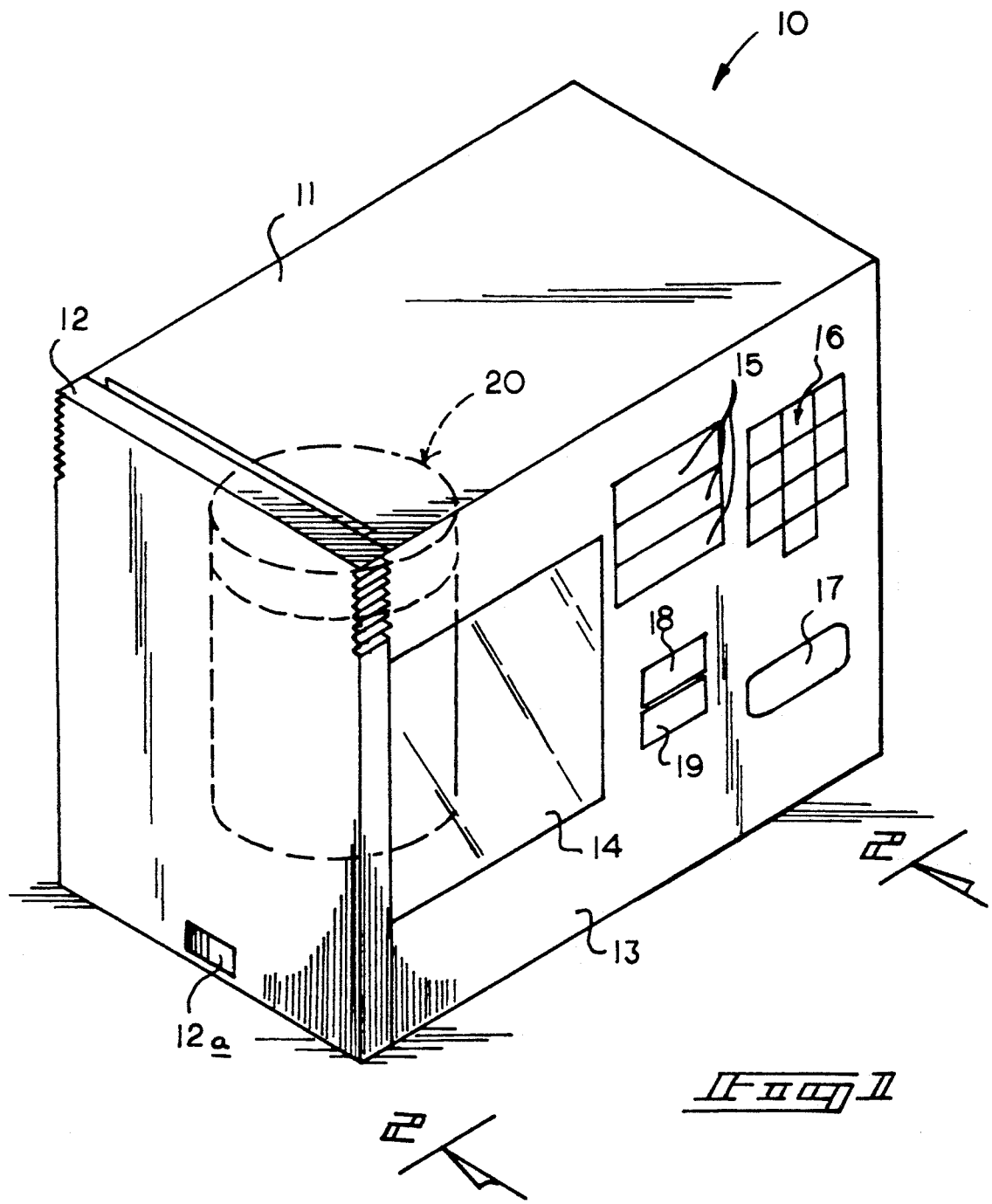

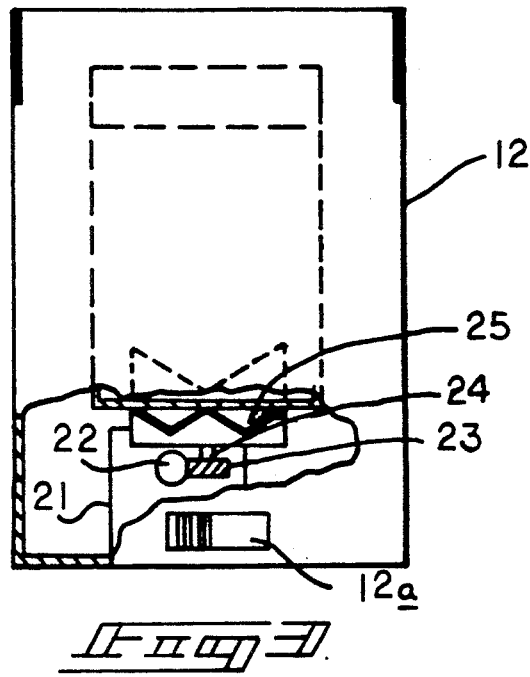
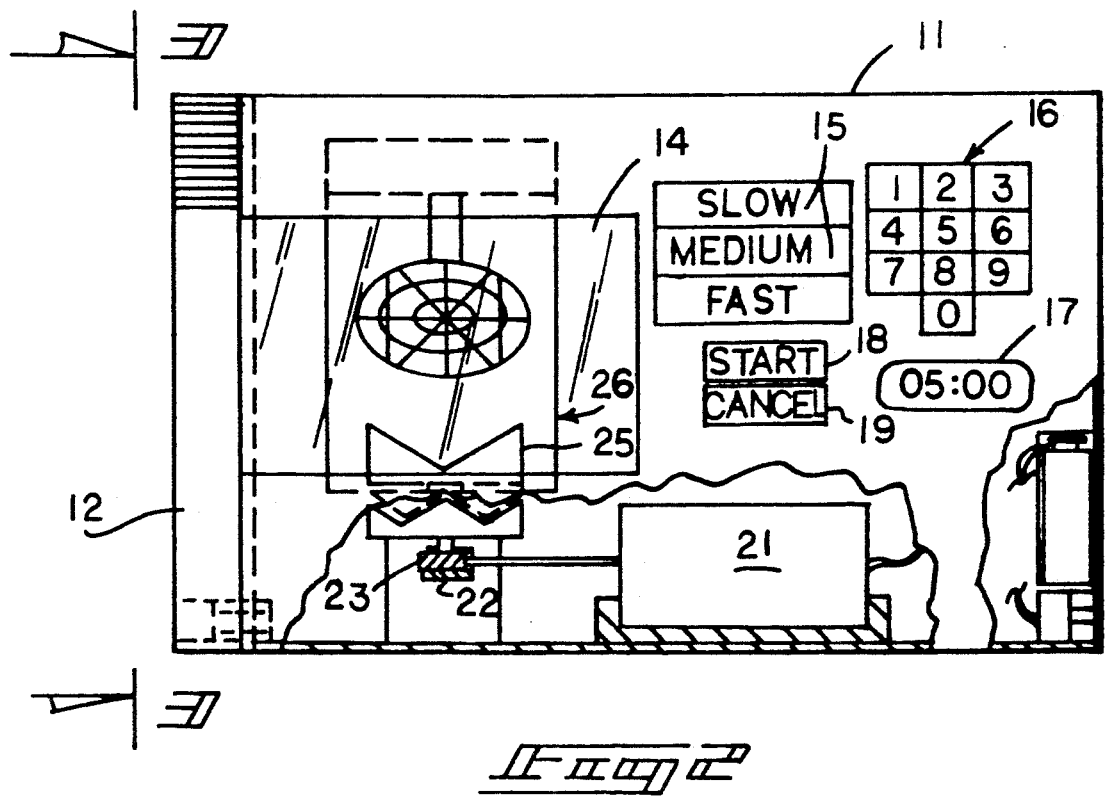

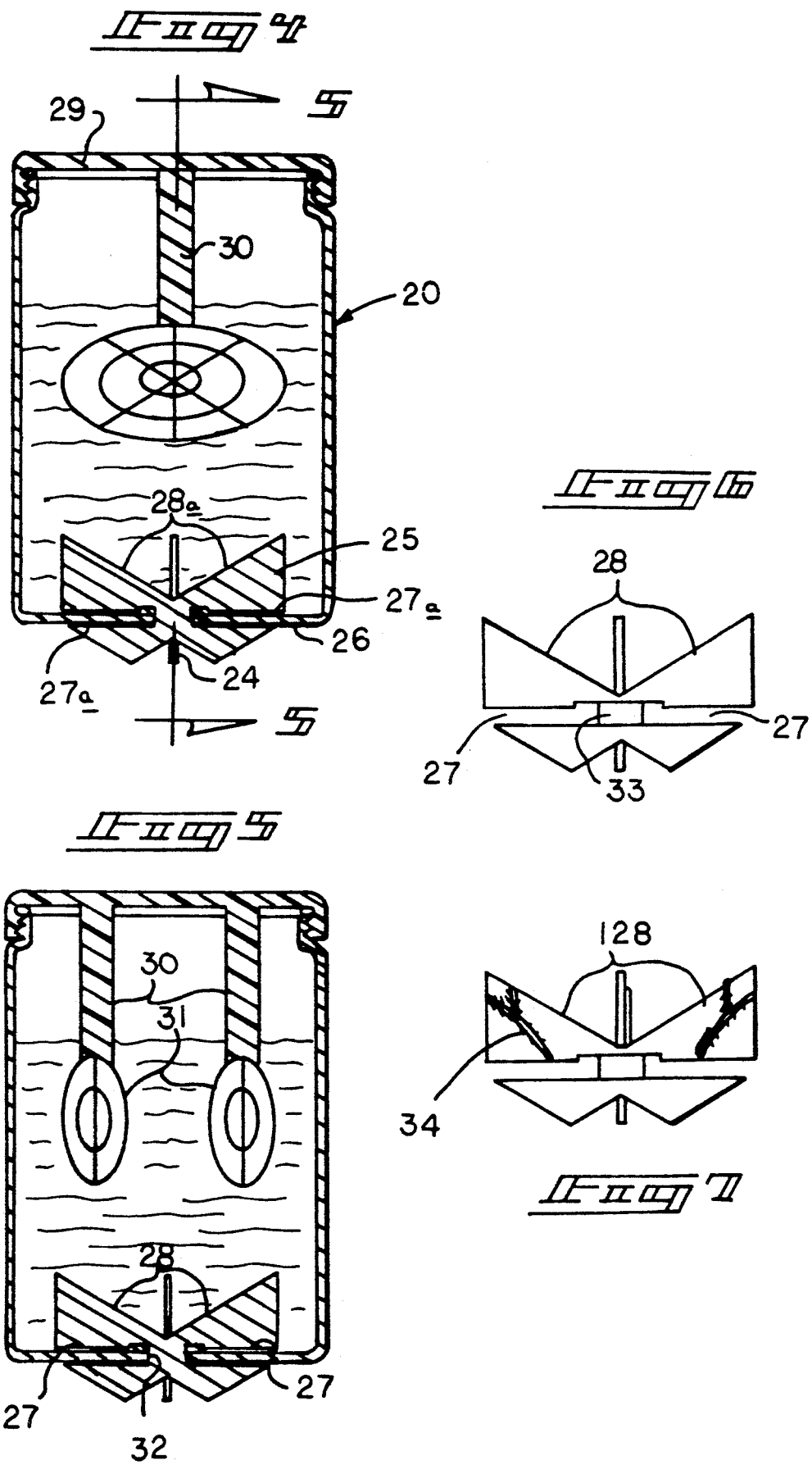

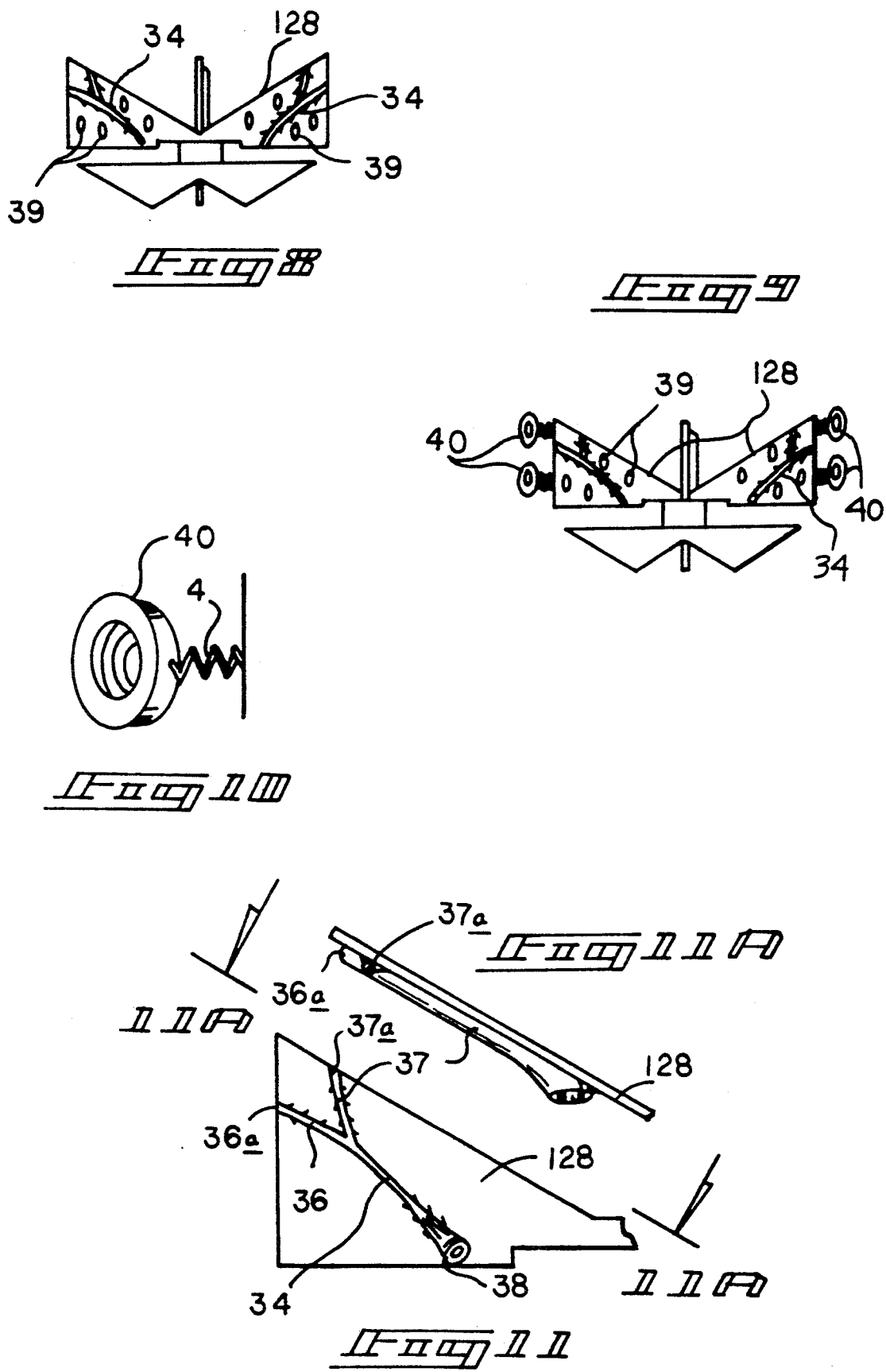

CONTACT LENS CLEANING APPARATUS

BACKGROUND OF THE INVENTION

1. Field of the Invention

The field of invention relates to cleaning apparatus, and more particularly pertains to a new and improved contact lens cleaning apparatus wherein the same directs the efficient cleaning of contact lenses in an efficient and expeditious manner.

2. Description of the Prior Art

Contact lens cleaning apparatus is utilized in the prior art for the cleaning utilizing various enzymatic and disinfecting solution, as well as a saline and neutralizing solution to effect cleaning of contact lenses. Such an apparatus is exemplified in the prior art by U.S. Pat. No. 4,852,592 to Digangi wherein a plurality of liquid releasing solenoids effect injection of liquid into a cleaning chamber mounting contact lenses to be cleaned.

U.S. Pat. No. 4,907,613 to Litzaw sets forth a contact lens cleaning device utilizing a rotary crank shaft directing rotary motion to reciprocation of an associated lens holder containing contact lenses therewithin for cleaning.

U.S. Pat. No. 4,779,300 to Pompe sets forth a contact lens cleaning device wherein a pad member is operative in manual manipulation of a contact lens to effect cleaning of the contact lens.

U.S. Pat. No. 4,780,152 to Itagaki, et al. sets forth a specificity of cleaning solution utilized in contact lens cleaning.

As such, it may be appreciated that there continues to be a need for a new and improved contact lens cleaning apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of contact lens cleaning apparatus now present in the prior art, the present invention provides a contact lens cleaning apparatus wherein the same utilizes an underlying impeller to agitate a cleaning solution to effect cleaning of contact lens members. As such, the general purpose of the present invention, which will be described subsequently in greater detail, is to provide a new and improved contact lens cleaning apparatus which has all the advantages of the prior art contact lens cleaning apparatus and none of the disadvantages.

To attain this, the present invention provides a container including a removable door for positioning of a housing therewithin. The housing includes a cleansing solution therein, with a removable lid mounting a plurality of mesh ocular contact lens members, wherein agitation of the cleaning solution by an underlying blade structure effects cleaning of the contact lenses.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended thereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved contact lens cleaning apparatus which has all the advantages of the prior art contact lens cleaning apparatus and none of the disadvantages.

It is another object of the present invention to provide a new and improved contact lens cleaning apparatus which may be easily and efficiently manufactured and marketed.

It is a further object of the present invention to provide a new and improved contact lens cleaning apparatus which is of a durable and reliable construction.

An even further object of the present invention is to provide a new and improved contact lens cleaning apparatus which is susceptible of a low cost of manufacture with regard to both materials and labor, and which accordingly is then susceptible of low prices of sale to the consuming public, thereby making such contact lens cleaning apparatus economically available to the buying public.

Still yet another object of the present invention is to provide a new and improved contact lens cleaning apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an orthographic view, taken along the lines 3—3 of FIG. 2 in the direction indicated by the arrows.

FIG. 4 is an orthographic cross-sectional view of the lens support housing utilized by the invention.

FIG. 5 is an orthographic view, taken along the lines 5—5 of FIG. 4 in the direction indicated by the arrows.

FIG. 6 is an orthographic side view of the turbine member utilized by the lens support housing.

FIG. 7 is an orthographic side view of a modified turbine member utilized by the invention.

FIG. 8 is the turbine blade member formed with blade slots.

FIG. 9 is an orthographic side view of the modified turbine blade member utilizing splash cups.

FIG. 10 is an isometric illustration of the splash cup structure utilized by the invention.

FIG. 11 is an orthographic side view, somewhat enlarged, of a single blade member of the turbine blade structure.

FIG. 11a is an orthographic view, taken along the lines 11a—11a of FIG. 11 in the direction indicated by the arrows.

DESCRIPTION OF THE PREFERRED EMBODIMENT

With reference now to the drawings, and in particular to FIGS. 1 to 11a thereof, a new and improved contact lens cleaning apparatus embodying the principles and concepts of the present invention and generally designated by the reference numeral 10 will be described.

More specifically, the contact lens cleaning apparatus 10 of the instant invention essentially comprises a container 11, including a door 12 removably mounted relative to an end wall of the container 11, with the door 12 including a latch 12a of a desired construction to permit securement and latching of the door relative to the housing. A front wall 13 of the container 11 includes a transparent viewing window 14 positioned in alignment with a lens support housing 20 mounted within the housing upon a support, wherein the support aligns a drive gear shaft 24 therethrough that includes a driven gear 23 at a lower terminal end thereof. The driven gear 23 cooperates with an output drive gear 22 of an associated drive motor 21. If desired, the door latch 12a may provide an electrical inner lock with the drive motor 21 to prevent its actuation in the event that the door 12 is not properly mounted relative to the housing 11, in a manner known in the prior art. Control for operation of the drive motor 21 is mounted upon the front wall 13 to include a speed selector switching 15, as well as a timer panel 16 operative to effect timing of the motor 21, to include an LCD readout 17 to indicate available time remaining in operation of the drive motor. Further, conventional start and cancel switching 18 and 19 is further provided for control of the device utilizing controlled mechanism circuitry readily available to one of ordinary skill in the art.

The lens support housing includes a housing bottom wall 26, with the housing bottom wall 26 including a bottom wall opening 32 defined by a predetermined diameter directed therethrough. The agitator impeller 25 is mounted rotatably within the housing bottom wall 26 directed through the bottom wall opening that is coaxially aligned with the support housing 20. The agitator impeller 25 includes plural pairs of blade members to include a first pair of first blades 28 and a second pair of second blade 28a, wherein each pair are orthogonally aligned relative to one another and radially mounted relative to the shaft 24. Each of the blades 28 and 28a includes respective first and second blade slots 27 and 27a that receive the bottom wall of the support housing 22 therewithin. In this manner, an impeller positioning hub 33 radially positioned medially of the slots defined by a predetermined external diameter equal to the predetermined internal diameter of the opening 32 rotatably mounts the impeller. Appropriate sealing may further be provided about the opening 32 within the bottom wall of the housing to enhance sealing of the impeller relative to the housing.

Further, the housing 20 includes a housing lid 29 that orthogonally mounts a plurality of support legs 30 downwardly therefrom, wherein the support legs 30 are arranged parallel relative to an axis defined by the housing 20 and each include an opened mesh lens container 31 mounted at a lower terminal end of each support leg for receiving a contact lens therewithin.

FIG. 7 illustrates a modified blade structure 128 that includes a primary conduit 34 mounted to a side wall thereof. The primary conduit 34 includes a first branch conduit 36 directed to a side of each blade, and a second branch conduit 37 directed to an upper top edge of each blade to include and terminate in a side outlet 36a and a top outlet 37a. An entrance funnel 38 is mounted adjacent a lower edge of each blade 128 to receive fluid therewithin and thereby transmit the fluid through the conduits 34, 36, and 37 for enhanced agitation of fluid within the support housing 20. Further, blade slots 39 (see FIG. 8) may be provided throughout the blade 128 to provide a misting and enhanced agitation of the fluid as the blade 128 rotates about its shaft 24.

Finally, the blade structure 128 optionally incorporates splash cups 40 that are mounted to resilient support mounts 41 extending radially outwardly of each blade mounted to a side edge of each blade, wherein the splash cups each include a concave cavity to enhance agitation and the splashing of water within the housing during rotation of the impeller structure, as illustrated.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A contact lens cleaning apparatus, comprising,
 a container, the container including a door defining an interior cavity of the container, the interior cavity including a drive motor, and control means for effecting selective actuation of the drive motor, the drive motor including an output drive gear, and a driven gear in cooperation with the drive gear, and the driven gear coupled to a driven gear shaft, and a lens support housing positioned within the container cavity, with the driven gear shaft directed through a bottom wall of the lens support housing, and an impeller rotatably mounted to the housing bottom wall, and the lens support housing including a cleaning solution therewithin, and the lens support housing including a housing lid, the housing lid including a plurality of support legs fixedly and orthogonally mounted to the housing lid, each support leg including an open mesh lens container mounted at a lower terminal end thereof for receiving a contact lens within each lens container, wherein selective rotation of the impeller by the motor effects selective cleaning of each contact lens within each respective lens container.

2. An apparatus as set forth in claim 1 wherein the impeller includes plural pairs of orthogonally oriented impeller blades, each impeller blade including a blade top edge, a blade side edge, and a blade bottom edge, and each blade includes a slot, each slot containing the housing bottom wall therewithin, and each slot orthogonally oriented relative to the driven gear shaft.

3. An apparatus as set forth in claim 2 wherein each blade includes a matrix of openings directed therethrough to effect enhanced agitation of the cleaning fluid.

4. An apparatus as set forth in claim 3 wherein each blade includes a primary conduit mounted to a side wall of each blade, and each primary conduit including an entrance funnel mounted adjacent the bottom edge of each blade, and the primary conduit including a first branch conduit and a second branch conduit, the first branch conduit directed to the side edge of each blade, and the second branch conduit directed to the top edge of each blade, and the first branch conduit terminating in a side outlet, and the second branch conduit terminating in a top outlet.

5. An apparatus as set forth in claim 4 wherein each side edge of each blade includes a plurality of resilient support mounts, and each resilient support mount projects exteriorly of each blade and each resilient support mount includes a splash cup, each splash cup includes a concave cavity, wherein each concave cavity with each splash cup is arranged for effecting enhanced agitation of the cleaning fluid.

* * * * *